UNITED STATES PATENT OFFICE 2,471,909

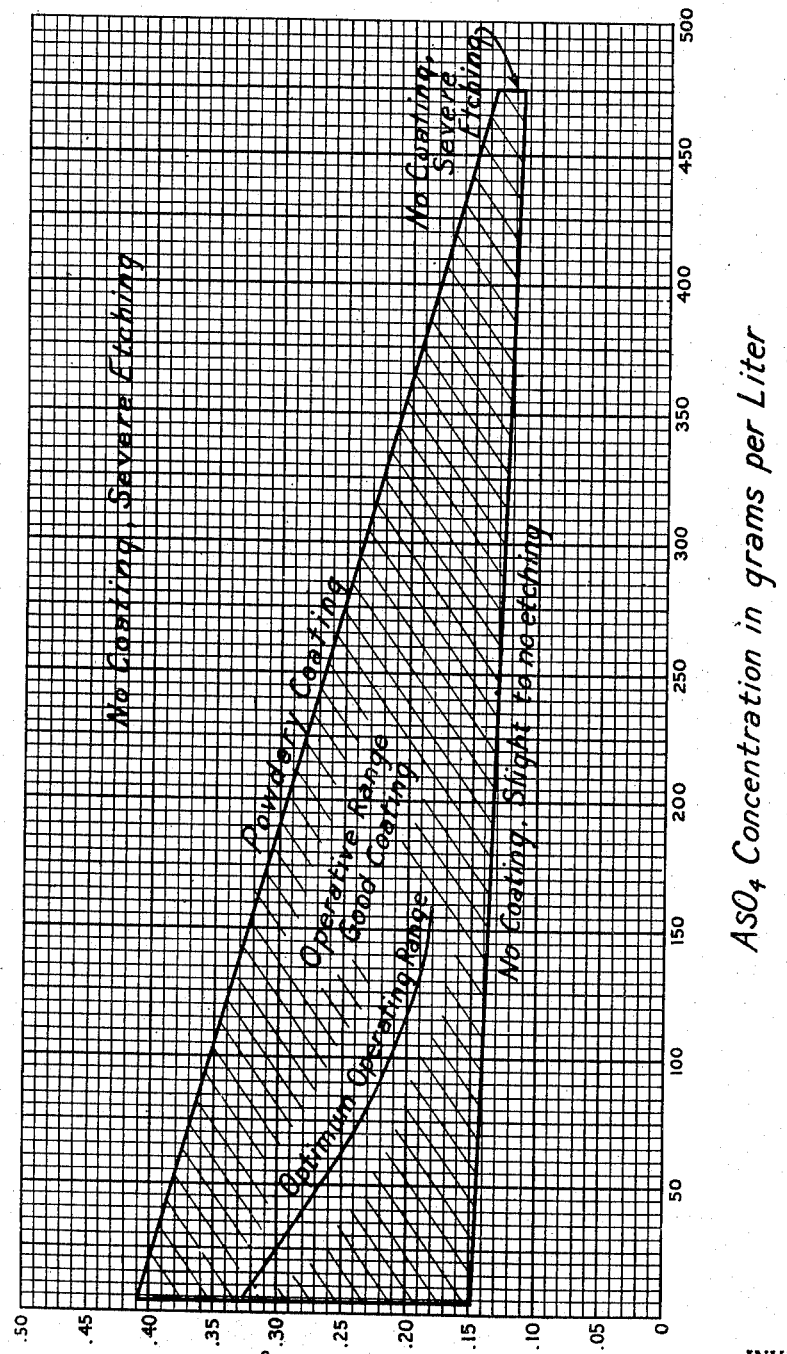

METHOD AND MATERIALS FOR PRODUCING COATED ALUMINUM

Frank Palin Spruance, Jr., Ambler, Pa., assignor to American Chemical Paint Company, Ambler, Pa., a corporation of Delaware Application March 9, 1946, Serial No. 653,418

9 Claims. (Cl. 148—6.2)

This invention relates to the art of coating aluminum and alloys thereof in which aluminum is the principal ingredient. The process for producing the coating, the materials employed in the process and the finally coated aluminum are all involved in the invention, which is particularly directed to the provision of a coating on aluminum or aluminiferous metals, which coating is extremely adherent and strongly corrosion resistant and highly satisfactory as a base for the reception of paint or other similar organic finish.

In the following description and in the appended claims I wish to point out that when reference is made to aluminum it is my intention to include not only aluminum per se but also all aluminiferous metals or alloys of aluminum which are composed principally of aluminum.

The principal objects of the invention are to increase, under normal service conditions, the durability of aluminum surfaces; to improve their resistance to humid or salt-laden atmospheres such, for example, as are encountered in the tropics or near or over the sea; to improve the durability and the degree of protection afforded by organic finishes such as paints, lacquers, etc. on aluminum surfaces; to provide a coating for aluminum surfaces which in itself is greatly protective and also decorative; and to attain the foregoing objectives by means and material which are more simple and more economical than any which have been employed hitherto in this art.

Stated more specifically, it is an object of my invention to produce a coating on aluminum, the major constituent of which is insoluble metallic arsenate, and which always contains aluminum arsenate. It is also an object to produce coatings which contain, in addition, chromium and fluorine in the form of insoluble compounds. In this connection I wish to note that treating solutions which contain metals which can form insoluble arsenates and/or fluorides may produce coatings containing insoluble compounds of such metals. For example, coatings may thus be produced containing insoluble arsenates and/or fluorides of iron, zinc, and manganese.

The foregoing, together with such other objects and advantages as may appear hereinafter or are incident to my invention, may be attained in accordance with the following disclosure which describes preferred materials and conditions useful in carrying out my invention, reference being had to the accompanying drawing in which the single figure is a graph illustrating the permissible variations in the quantities of ingredients entering into the compositions employed with certain embodiments of my invention.

The accompanying drawing is a chart illustrating the effect on coating characteristics of variations in the proportions of the ingredients used.

A preferred method of carrying out my invention is based upon the discovery that treatment of aluminum with aqueous acid solutions containing arsenic acid, chromic acid, and a water soluble compound of fluorine in a certain well defined region as to the proportions of the ingredients, leads to the formation of an adherent, smooth but not usually shiny, greenish gray to pale green coating which has decorative value as well as outstanding merit in inhibiting corrosion and improving paint durability.

Generally speaking, my novel coating process makes use of an aqueous acid solution containing arsenate ions, fluoride ions, and dichromate ions. The form in which the ions are introduced seems to make little or no difference as long as these remain in the solution in the correct proportions and the solution has the proper acidity. For instance, the arsenate ion may be introduced as arsenic pentoxide or as certain metallic arsenates such as zinc, iron, or manganese; the fluoride ion may be introduced as a solution of hydrofluoric acid, as sodium fluoride, or as potassium acid fluoride; the dichromate ion may be introduced as chromic acid ($CrO_3$), or as sodium chromate or dichromate. Naturally the amount of acid which is to be added will depend upon the form in which the essential ions are added to the solution and the kind of acid employed is not important within the limitations, as will be further explained below.

The kind and quantity of cations which may be present are not in themselves important except insofar as their salts act as buffers to regulate the effective acidity of the solution, or as they may cause the loss of active anions by precipitation of salts whose solubility products may be exceeded. Among the cations which may be present in reasonable quantity without doing harm are those of aluminum, trivalent chromium, zinc, copper, manganese, iron, nickel, cobalt, calcium, barium, strontium, tin, and others. Excessive amounts of these materials may tend to cause a loss of fluoride ion by precipitation, but do no noticeable harm. Fluoride so lost may be replaced and the solution thus restored to its optimum condition.

Foreign anions may also be present in moderate quantities without causing any difficulty. For example, relatively large amounts of sulphate, nitrate, acetate and chloride ions are tolerated without difficulty. Reducing agents are harmful because they cause a loss of dichromate ion by reduction of hexavalent to trivalent chromium.

My process has been successfully applied to a variety of commonly used alloys consisting largely of aluminum as well as pure aluminum. A few of the well known alloys to which the process has been successfully applied, are the following:

| Name | Percent Alloying Element | | | | | |
|---|---|---|---|---|---|---|
| | Cu | Mn | Mg | Si | Cr | Al |
| 2S | | | | | | 99.2+ |
| 3S | | 1.2 | | | | 98+ |
| 24S | 4.5 | 0.6 | 1.5 | | | Balance |
| 52S | | | 2.5 | | 0.25 | Balance |
| 53S | | | 1.3 | 0.7 | 0.25 | Balance |

The solutions used in performing my improved coating process are characterized by a content of acid, fluoride ion, arsenate ion, and dichromate ion which are within a certain well-defined area. Generally stated, the region of concentrations within which my solutions must be maintained for satisfactory coating is defined as follows:

1. The arsenate ion content must be at least 3.24 grams per liter, and, preferably, at least 9.7 grams per liter, calculated as arsenate. At concentrations below 9.7 grams per liter the operative concentrations of dichromate ion and fluoride ion become extremely critical; below 3.24 grams per liter it is hardly possible to maintain the dichromate and fluoride concentrations with sufficient accuracy to operate the process even upon a small area of metal per unit volume of bath. At 9.7 grams per liter of arsenate the range of permissible fluoride and dichromate is large enough to permit practical operation on a succession of metal parts. However, even at this concentration rather careful control and frequent restoration of arsenate, fluoride, acid and chromate are necessary to maintain the solution in optimum working condition. A good working concentration of arsenate content is between 32.4 and 162 grams per liter. A practical maximum is about 462 grams per liter.

2. The ratio of fluoride ion to dichromate ion, by weight, (calculated as chromic acid, $CrO_3$) must be between 0.135 and 0.405, and, preferably, between 0.18 and 0.36.

Too high a ratio of fluoride ion to dichromate leads to the formation of loose coatings or to the absence of coatings and the production of a surface which is merely etched, in contrast with the development of the tight, adherent, continuous coatings resistant to abrasion and bending, which are formed under optimum conditions.

A ratio of fluoride ion to dichromate ion which is somewhat too low leads to the development of very thin coatings; at even lower ratios no visible coating action takes place, and the metal remains smooth and bright.

3. The total acidity of the solution must not exceed that corresponding to 3.0 normal acid. For the purposes of this calculation all poly-basic acids whose second ionization constants are less than $10^{-4}$ may be considered to be monobasic. For such acids, the second and subsequent ionizable hydrogen atoms make less than a 1.0% contribution to the hydrogen ion content of their aqueous solutions at pH=2.0 or below. The solutions which are suitable have pH's between about 1.4 and 2.8 and preferably around 1.7 to 1.9. An example of such acid is arsenic acid.

Somewhat too high an acidity results in a powdery, non-adherent coating; still higher acidity results in a strong etch and no attached coating.

It must be explained that the absolute quantities of acid and of anions which may be present under operative conditions are not independent. The actual hydrogen ion concentration of the solution is a function of the dissociation constants of the acids corresponding to the anions present. In the absence of anions of acids weaker than arsenic acid, hydrofluoric acid, or chromic acid, the hydrogen ion content of the solution falls with increase in the quantity of arsenate, fluoride, and dichromate. It has been found necessary to have in the solution a greater amount of acid the greater the quantities of these ions present.

It is desirable to express the acidity of the operative solutions in terms of pH. Unfortunately no accurate means of measuring the pH of these solutions has been found. The use of indicators is unreliable because the indicators are oxidized by the dichromate ion present. The electrical pH meter, using the glass electrode is unreliable because of the effect of the fluoride ion upon the glass. The hydrogen and quinhydrone electrodes are likewise inapplicable because of the oxidizing effect of the dichromate.

The glass electrode, however, seems to give readings which, while they often exhibit a curious excursion with time from a low value to a value as much as a pH unit higher, and then back to a value even lower than at first, seem to have some significance, even though they are not unequivocally interpretable. Since a recheck in a standard buffer solution of the glass electrode, after a measurement of one of my coating solutions, shows very little change, it may be assumed that the electrode is not permanently damaged by use for the measurement of my coating solutions.

With these limitations in mind, the final, nearly steady reading of pH, by means of a commercial glass electrode pH meter, in my improved solutions in correct operating condition, falls in the range 1.4 to 2.8, and for optimum coating conditions, in the range 1.7 to 1.9.

To prepare a solution for operating my improved coating process there may be added to water:

1. Sufficient arsenate ion, in the form of arsenic acid or any arsenate soluble at a pH of about 2, to give an arsenate content of at least 3.24 grams per liter, and better, 9.7 grams per liter.

2. Materials containing fluoride and hexavalent chromium in a quantity sufficient to give a ratio of dissolved fluorine to dissolved hexavalent chromium (calculated as $F:CrO_3$) of between 0.135 and 0.405, or preferably, between 0.18 and 0.36. The optimum generally is near 0.27.

3. An acid, preferably one at least as strong as HF, to give an apparent pH as measured by a commercial glass-electrode pH meter of 1.4 to 2.8, or, preferably, from 1.7 to 1.9 as measured by the lowest value indicated within the first 10 minutes of immersion of the glass electrode in the solution.

This step is, of course, subject to the limitations stated above. In any case, provided the arsenate, dichromate, and fluoride are present in the proper quantities, the exact quantity of acid to be used may be checked by the appearance of the coating produced during actual processing of aluminum surfaces. As stated above, too low an acidity leads to no coating or a very thin coat. Too high an acidity leads to loose powdery coatings, still higher acidity to a strong etch, sometimes preceded by the formation of visible coatings which wash off on removal of the treated part from the bath or on rinsing it with water.

In carrying out my improved process the surfaces to be coated should be clean. The cleaning, which forms no part of the present invention, may be carried out by conventional methods. For example, grease and dirt may be removed by a mild silicate alkali spray or by the use of an emulsion of a grease solvent. Heavy oxide films may be removed by acid or caustic soda treatments. The cleaned work, which may be wet or dry, is treated with solution of proper composition, of which one example is following:

Formula No. 1

| | | |
|---|---|---|
| Arsenic acid ($As_2O_5$) | grams | 92.5 |
| Sodium fluoride | do | 5.0 |
| Chromic acid ($CrO_3$) | do | 10.0 |
| Water, to make | liter | 1 |

The treatment may be preformed by immersing the surfaces to be coated in the solution, by flowing or spraying the solution upon the work, or by other convenient techniques in which the solution is allowed to act upon the work. If the solution is merely applied to the work momentarily after which the adhering film of solution is allowed to act for some time, it is desirable to use a solution considerably more concentrated than that of Formula No. 1.

The action of the solution may be accelerated by heat. The solution may be kept at any temperature from ordinary room temperature to 180° F. or more. Similar coatings appear to be formed independent of temperature but the time for complete coating formation may be reduced from about 5 to 10 minutes to 1 to 2 minutes, or even less by such a rise in temperature.

A number of alternative bath formulas are given below by way of illustration, illustrating a few of the many variations in composition which my improved compositions may take within their operating range.

Formula No. 2

| | | |
|---|---|---|
| $H_3AsO_4$ | grams | 17.4 |
| NaF | do | 3.1 |
| $CrO_3$ | do | 3.6 |
| Water, to make | liter | 1 |

Formula No. 3

| | | |
|---|---|---|
| $H_3AsO_4$ | grams | 34.8 |
| NaF | do | 5.0 |
| $CrO_3$ | do | 6.8 |
| Water, to make | liter | 1 |

Formula No. 4

| | | |
|---|---|---|
| $NaH_2AsO_4.H_2O$ | grams | 41.8 |
| NaF | do | 5.0 |
| $K_2Cr_2O_7$ | do | 10.6 |
| HCl | do | 4.8 |
| Water, to make | liter | 1 |

Formula No. 5

| | | |
|---|---|---|
| $NaH_2AsO_4.H_2O$ | grams | 87.6 |
| NaHF | do | 4.2 |
| $K_2Cr_2O_7$ | do | 14.7 |
| $H_2SO_4$ | do | 4.8 |
| Water, to make | liter | 1 |

Formula No. 6

| | | |
|---|---|---|
| $NaH_2AsO_4.H_2O$ | grams | 41.8 |
| $AlF_3$ | do | 5.0 |
| $K_2Cr_2O_7$ | do | 10.6 |
| HCl | do | 4.6 |
| Water, to make | liter | 1 |

Of these examples of coating solutions Formulas Nos. 1, 2, 3 and 4 produced normal weight coatings, and Formulas Nos. 5 and 6 produced coatings of slightly less weight than normal.

Maintenance of my solutions in operating condition during the processing of a succession of surfaces requires merely that the proportion of dissolved ions and acidity be kept within the prescribed limits by suitable additions of chemicals. It is to be noted that the coating operation consumes chemicals as follows:

1. Acid is consumed by attack on the metal. This is accompanied by an evolution of hydrogen during the coating operation.
2. Arsenate and fluoride are included in the coating, as evidenced by its analysis.
3. Dichromate is consumed by reduction to trivalent chromium, some of which is included in the coating, some of which remains dissolved in the solution.
4. The accumulation of dissolved aluminum in the solution leads, ultimately, to a loss of fluoride as a precipitate af aluminum fluoride.
5. Some trivalent chromium may be precipitated when this accumulates to a sufficient degree as the fluoride and/or arsenate.

These losses, as well as gross loss of solution due to "drag-out" on the surface of the work, must be replaced to maintain the bath within its operating limits. The precipitates referred to are apparently without effect except as they are mechanically objectionable. In any case, they may be removed without difficulty by decantation or filtration.

After treatment with my improved solution as described, maximum corrosion resistance is obtained by allowing adhering solution to dry upon the coated surface before rinsing it. If the surface is not to be painted or coated with other organic finishes, the surface may be left unrinsed after it has dried. If an organic finish is to be applied to the coated and dried surface, it should then be thoroughly rinsed with pure water to remove all soluble salts which are likely to cause blistering of the paint or other organic film, especially if the surface is exposed to humid conditions.

The drying of the coated surfaces with their adhering solution may be accomplished at ordinary room temperature or at elevated temperatures to expedite the drying. If the nitric acid insoluble type of coating, described below, is not desired, the time and temperature exposure to the drying oven should be limited to remove physical moisture only. Longer heating, especially at temperatures above the boiling point of water, will drive off chemically bound water and insolubilize the coatings as described below.

Small amounts of soluble salts left on the dried surface may be rendered much less harmful if the surface is treated, after coating and drying, with a dilute solution containing free chromic acid. Thus, if there is any possibility that the water used for rinsing is too high in dissolved salts for absolute safety, it has been found desirable finally to rinse the coated and dried surfaces with a dilute chromic acid solution containing from ½ to 8 ounces of chromic acid per 100 gallons of water, after which the surfaces are again dried. This treatment cannot be harmful and may, therefore, be applied as a matter of routine whether or not the water supply is known to be too high in soluble salts.

The coatings produced by my improved process, as carried out in the examples just given, contain aluminum, fluorine, arsenic, chromium, oxygen, and hydrogen as their principal constituents. On heating they lose up to 40% of their weight. Physically such heating seems to produce no obvious change; chemically, however, the coatings become much more resistant after dehydration by heating. For example, as produced by treatment with my improved process but before heating the coatings are fairly readily soluble in 70% nitric acid. After heating they dissolve only with great difficulty and on long boiling in this acid. This inertness of the heated coatings is of considerable advantage in the protection of aluminum which is exposed to certain corrosive chemicals.

Although, as previously stated, my coating solutions can be prepared from a variety of starting substances, possibly the simplest, cheapest, and most easily available combination of chemicals from which to prepare them is one containing an alkali fluoride, arsenic acid and chromic acid ($CrO_3$). The limits of composition within which the coating process is operative have been indicated.

At this point I should also like to point out that it is possible to use a metallic arsenate as a source of arsenate ion and if a metallic arsenate is used the metal as well as the arsenate ion will remain to a certain extent on the surface of the aluminum being treated. A number of such metallic arsenates have been mentioned above but regardless of the source of the arsenate ion a typical analysis of the coating produced would be as follows:

|  | Per cent |
|---|---|
| Total metal arsenates | 68.8 |
| Fluorine | 2.0 |
| Moisture | 29.2 |
|  | 100.0 |

However, analyses of these coatings are rather difficult to make, for which reason the foregoing is only representative or typical and it must be understood that the total metallic arsenate content present may vary by as much as ±10%. At the same time it will be apparent to those skilled in the art that the content of the other constituents will vary accordingly. Also, in the event that the coating has been dried and then analyzed, the percentages naturally would increase in proportion to the loss in water.

In employing a solution according to any one of the formulas given above, a typical analysis of the coating secured would be somewhat as follows:

|  | Per cent |
|---|---|
| Aluminum arsenate | 47.2 |
| Chromium arsenate | 28.7 |
| Moisture | 22.8 |
| Fluorine | 1.3 |
|  | 100.0 |

It will be seen from both of the foregoing analyses of typical coatings that the principal constituent of the coating is metal arsenate and in instances where the arsenate ion is supplied primarily through the use of arsenic acid the principal arsenate constituent will be aluminum arsenate.

For illustrative purposes and as a guide to the operation of the process with the particular chemicals just specified, reference is made to the chart shown in the accompanying drawing in which each point represents a group of solutions for which the ratio of fluoride ion:chromic acid used in preparing the solutions is plotted as ordinate against the arsenic acid used in grams per liter, as abscissa. The cross-hatched area marked "Operative range, good coating" represents the field of compositions within which my novel solutions and process have been found to be operable. The effect of alteration in the proportions of ingredients so that the composition of a solution falls outside the operative range, is indicated by an appropriate description on the chart. Compositions selected as optimum in performance are indicated by the heavy dotted line marked "Optimum line."

I wish it to be understood, however, that a very large number of charts or diagrams could be prepared to indicate the regions within which my process and the solutions employed therewith are operable depending, of course, on the starting materials.

Although exact maximum and minimum amounts of fluoride and dichromate to be used in my improved solutions are difficult to specify, aside from the $F:CrO_3$ ratio, it has been found, generally, that:

1. The fluoride ion content should lie between 0.9 and 12.5 grams per liter, and preferably between 2.0 and 6.0 grams per liter.

2. The dichromate ion content should correspond to a total $CrO_3$ content of between 3.75 and 60 grams per liter, and preferably between 6.0 and 20 grams per liter.

A good balance between economy in dragged-out chemical, ease of control, and good results in coating is obtained in the preferred range specified.

Since the essential ingredients of my coating solution are fluoride ion, arsenate ion, dichromate ion, and hydrogen ion, it has been found desirable in making up and replenishing the solution to use concentrated admixtures which need only be added to water or to acidified water to produce operative solutions of the proper composition. Such admixtures have the advantages that:

1. Only one chemical mixture, or at the most two, need to be weighed or measured to make up the solution.

2. Shipping space and weight are saved by the omission of much of the water from the admixture.

3. Errors in calculating and measuring the proportions of the ingredients are minimized, since the proportions are fixed by the composition of the concentrated admixture which can be prepared and checked once and for all.

For making a fresh solution, the concentrated admixture may contain, for example, compounds of fluorine, of arsenic (as arsenate), and of hexavalent chromium, all in a form soluble in water at pH about 2. The composition should contain the constituents in the following proportions:

|  | Parts |
|---|---|
| Fluorine, by weight | 1 |
| Chromium, calculated as $CrO_3$ | 2.47 to 7.40 |
| Arsenate | 2.9 to 102 |

The best compositions should contain, for each part of fluorine, 2.88 to 5.55 parts chromium, calculated as $CrO_3$, and 10.2 to 73.5 parts of arsenate.

The above admixtures may or may not be compounded to include free acid. The inclusion of acid is desirable from the standpoint of ease in preparing the actual coating solutions, since nothing but water and the concentrated admixture is necessary. However, strong acid solutions containing fluoride and chromate are corrosive and somewhat dangerous to handle. Therefore, acid may be omitted from the composition.

Concentrated compositions may be made up as solutions, slurries, or solids. For ease in shipping and handling solid admixtures are particularly desirable. To get usable coating solutions these need only to be added to water, acidulated to the proper degree.

Prefered embodiments of my invention as regards make-up material for my improved coating solution, embodying only easily obtainable chemicals are as follows:

Formula No. 7

| | Pounds |
|---|---|
| Sodium fluoride | 4.8 |
| Chromic acid ($CrO_3$) | 9.6 |
| Monosodium dihydrogen arsenate ($NaH_2As_2O_4H_2O$) | 85.6 |
| | 100.0 |

When the total material of Formula No. 7 is dissolved in 150 to 300 gallons of water, from 3.0 to 4.3 gallons of 20° Bé. hydrochloric acid will be required to yield a solution in optimum operative condition, depending on the volume of water used.

Another formula for a concentrate, suitable for dilution with about nine times its volume of water to make a coating solution of optimum quality is the following:

Formula No. 8

| | | |
|---|---|---|
| Potassium hydrogen fluoride ($KHF_2$) | lb. | 0.158 |
| Chromic acid ($CrO_3$) | lb. | 0.316 |
| $As_2O_5$ | lb. | 5.860 |
| Water, to make | gal. | 1.000 |

This material must be stored and shipped in containers suitably corrosion resistant.

For reasons of cheapness and availability I prefer to use an alkali fluoride or acid fluoride, an alkali chromate, an alkali dichromate, or free chromic acid, and an alkali arsenate or free arsenic acid in making compositions of this type.

It must be noted that the consumption of fluoride, arsenate, dichromate, and acid during the coating of a succession of surfaces is not usually in the same proportion in which these constituents exist in the solution. In general, the consumption of these ingredients depends somewhat upon the kind and surface finish of the metal treated. The relative rates of consumption of the ingredients are generally about as follows, by weight:

| | |
|---|---|
| Fluorine grams | 1.0 |
| Chromium, as $CrO_3$ grams | 0.7 to 1.4 |
| Acid, gram equivalents of replaceable hydrogen | 0.06 to 0.14 |
| Arsenate grams | .73 to 1.46 |

Since the tolerance of my improved coating solution for variations from the optimum ratio of ingredients is reasonably large, within the limits previously stated, it is possible for limited periods to effect replenishment of the solution with any of the concentrated make-up materials previously described, as, for example, those of Formulas 7 and 8, without failure of the coating process. However, it has been found that if the same solution is to be used for coating a large area of metal, the relative rate of consumption of the ingredients is sufficiently different from their initial relative concentrations so that concentrated admixtures designed for making up the original solution are not capable of indefinitely maintaining the proper ratios of constituents in the working bath.

It has, therefore, been found desirable to prepare admixtures having a ratio of ingredients more nearly like that in which they are consumed. For this purpose compounds of fluorine, of arsenic (as arsenate), and of hexavalent chromium, all soluble in water at about pH 2, are admixed in the ratio shown above, namely, grams fluorine : grams chromium (as $CrO_3$) : grams arsenate (as $AsO_4$) 1.0:0.70 to 1.40:0.73 to 1.46.

If the replenishing material is also to contain acid, which must otherwise be added separately, the ratio grams fluorine : gram equivalents of acid (replaceable hydrogen), should be from 1.0:0.05 to 1.0:0.10.

An example of a solid replenishing admixture for ingredients of the solution other than the acid is

Formula No. 9

| | Pounds |
|---|---|
| Potassium fluoride | 61.8 |
| Chromic acid, $CrO_3$ | 14.6 |
| Monosodium dihydrogen arsenate ($NaH_2As_2O_4.H_2O$) | 23.6 |
| | 100.0 |

This material is added, as required to maintain the composition and the activity of the solution, along with an acid in sufficient quantity to maintain proper pH and activity.

A solid replenishing material including acid is formulated, for example as follows:

Formula No. 10

| | Pounds |
|---|---|
| Sodium fluoride | 17.8 |
| Sodium dihydrogen arsenate | 11.5 |
| Sodium dichromate | 12.6 |
| Sodium acid sulfate | 58.1 |
| | 100.0 |

Replenishment of a bath with this material alone usually results in maintaining it in good operating condition for a long time. It should be noticed that in the above formula sodium acid sulfate is included. The purpose of this material is to bring the replenished bath into the optimum pH range and it serves no other purpose. From this it may be seen that both the original bath and the replenishing material may contain materials which do not appear in the coating and serve only for the purpose of regulating the pH of the bath without departing from the spirit and purpose of my novel and improved process.

I claim:

1. As a composition for coating alumium, an acid aqueous solution the essential, active, coating-producing ingredients of which consist of fluoride, dichromate, arsenate and hydrogen ions, the ions being present in amounts stoichiometrically equivalents to

| | Grams per liter |
|---|---|
| Fluorine | 0.9 to 12.5 |
| Chromic acid ($CrO_3$) | 3.75 to 60.0 |
| Arsenate ($AsO_4$) | 3.24 to 462 | the ratio of fluoride ion to dichromate, expressed as $F : CrO_3$, being between 0.135 and 0.405; and the pH of the solution being between about 1.4 and 2.8, as measured by the lowest value indicated by a glass-electrode pH meter within the first ten minutes of immersion of the electrode in the solution.

2. The solution of claim 1 in which the ions are present in amounts stoichiometrically equivalent to

| | Grams per liter |
|---|---|
| Fluorine | 2.0 to 6.0 |
| Chromic acid ($CrO_3$) | 6.0 to 20.0 |
| Arsenate ($AsO_4$) | 32.4 to 162 | the ratio of fluoride to dichromate, expressed as $F : CrO_3$, being between 0.18 and 0.36.

3. An admixture for use in preparing a solution for coating aluminum, the essential, active, coating-producing ingredients of which admixture consist of compounds of fluorine, of arsenic as arsenate, and of hexavalent chromium, all in forms soluble in water at pH 2 and in which for each part by weight of fluorine there are from 2.47 to 7.40 parts of chromium, calculated as $CrO_3$, and 2.9 to 102 parts of arsenic, calculated as $AsO_4$.

4. The admixture of claim 3 in which for each part, by weight, of fluorine there are from 2.88 to 5.55 parts of chromium, calculated as $CrO_3$, and 10.2 to 73.5 parts of arsenic, calculated as $AsO_4$.

5. An admixture for use in replenishing a solution for coating aluminum, the essential, active, coating-producing ingredients of which admixture consist of compounds of fluorine, of arsenic as arsenate, and of hexavalent chromium, all in forms soluble in water at pH 2 and in which, for each part by weight of fluorine, there are from 0.70 to 1.40 parts of chromium, calculated as $CrO_3$, and from 0.73 to 1.46 parts of arsenic, calculated as $AsO_4$.

6. In a process for coating aluminum, the step which consists in subjecting the metal to the action of an acid aqueous solution the essential, active, coating-producing ingredients of which are fluoride ion, dichromate ion, arsenate ion and hydrogen ion, the ions being present in amounts stoichiometrically equivalent to

| | Grams per liter |
|---|---|
| Fluorine | 0.9 to 12.5 |
| Chromic acid ($CrO_3$) | 3.75 to 60.0 |
| Arsenate ($AsO_4$) | 3.24 to 462 | the ratio of fluoride ion to dichromate, expressed as $F : CrO_3$, being between 0.135 and 0.405; the pH of the solution being between about 1.4 and 2.8, as measured by the lowest value indicated by a glass-electrode pH meter within the first ten minutes of immersion of the electrode in the solution.

7. A process for coating aluminum in accordance with claim 6 wherein the coating solution is allowed to dry upon the surface and is then rinsed and subsequently dried again.

8. A process according to claim 7, in which the rinsing step between the two drying steps is performed with a solution of chromic acid containing from ½ to 8 ozs. of chromic acid per 100 gals.

9. A process for coating aluminum consisting in treating the metal with an acid aqueous solution the essential, active, coating-producing ingredients of which are fluoride ion, dichromate ion, arsenate ion and hydrogen ion, the ions being present in amounts stoichiometrically equivalent to

| | Grams per liter |
|---|---|
| Fluorine | 0.9 to 12.5 |
| Chromic acid ($CrO_3$) | 3.75 to 60.0 |
| Arsenate ($AsO_4$) | 3.24 to 462 | the ratio of fluoride ion to dichromate, expressed as $F : CrO_3$, being between 0.135 and 0.405; the pH of the solution being between about 1.4 and 2.8, as measured by the lowest value indicated by a glass-electrode pH meter within the first ten minutes of immersion of the electrode in the solution, and heating the treated metal to at least partially dehydrate the coating formed by the solution.

FRANK PALIN SPRUANCE, JR.

REFERENCES CITED

The following references are of record in the file of this patent:

UNITED STATES PATENTS

| Number | Name | Date |
|---|---|---|
| 1,072,485 | Moran et al. | Sept. 9, 1913 |
| 1,583,006 | Pierce et al. | May 4, 1926 |
| 1,938,961 | Gravell | Dec. 12, 1933 |
| 2,005,780 | Gravell | June 25, 1935 |
| 2,012,976 | Schmittutz | Sept. 3, 1935 |
| 2,385,800 | Douty et al. | Oct. 2, 1945 |
| 2,438,877 | Spruance, Jr. | Mar. 30, 1948 |